United States Statutory Invention Registration [19]

[11] Reg. Number: H632

Johnson [43] Published: May 2, 1989

[54] OPTICAL NEUROMORPHIC EMBODIMENTS OF SELF-REGULATING NEURAL NETWORKS

[75] Inventor: John L. Johnson, Huntsville, Ala.

[73] Assignee: The United States of America as represented by the Secretary of the Army, Washington, D.C.

[21] Appl. No.: 151,052

[22] Filed: Feb. 1, 1988

[51] Int. Cl.[4] ..... G02B 6/10; H01S 3/00

[52] U.S. Cl. ..... 350/96.13; 332/7.51

*Primary Examiner*—Stephen C. Buczinski
*Assistant Examiner*—Linda J. Wallace
*Attorney, Agent, or Firm*—John C. Garvin, Jr.; Freddie M. Bush; Robert C. Sims

[57] ABSTRACT

Optical solutions for self regulating neural networks are carried out by three processors. Two use the nonlinearity of devices such as a phosphor screen and nonlinear cladding of optical fibers whereby the nonlinear regulating process is carried out. The third is accomplished by a ring cavity having a damped inhibitory loop where the signals are combined 180° out of phase.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL NEUROMORPHIC EMBODIMENTS OF SELF-REGULATING NEURAL NETWORKS

DEDICATORY CLAUSE

The invention described herein may be manufactured, used, and licensed by or for the Government for governmental purposes without the payment to me of any royalties thereon.

SUMMARY OF THE INVENTION

The purpose of this invention is to generally improve the qualities of an optical signal. The invention improves an optical signal by normalizing the intensity (i.e., darkening and/or brightening various portions of the picture as necessary), providing better contrast and enhancing detail of the overall picture while inhibiting noise and low-level features.

Normalization and enhancement is accomplished by nonlinear competitive interactions of image regions at fine and coarse resolution levels. Noise and low-level feature inhibition is achieved by recurrent feedback and nonlinear thresholding.

After signal normalization, the strength of every element within local, predefined areas of the overall signal is inhibited or reduced by approximately the average strength of the signal within the respective areas. This inhibition or reduction has the effect of enhancing the ratio of relative strength between adjacent elements. As a consequence, better contrast and enhanced detail of the picture is provided. Noise inhibition is achieved by thresholding the signals, and is distinct from the above area inhibition.

DETAILED DESCRIPTION OF THE PREFERRED EMBODIMENTS

Figure 1:
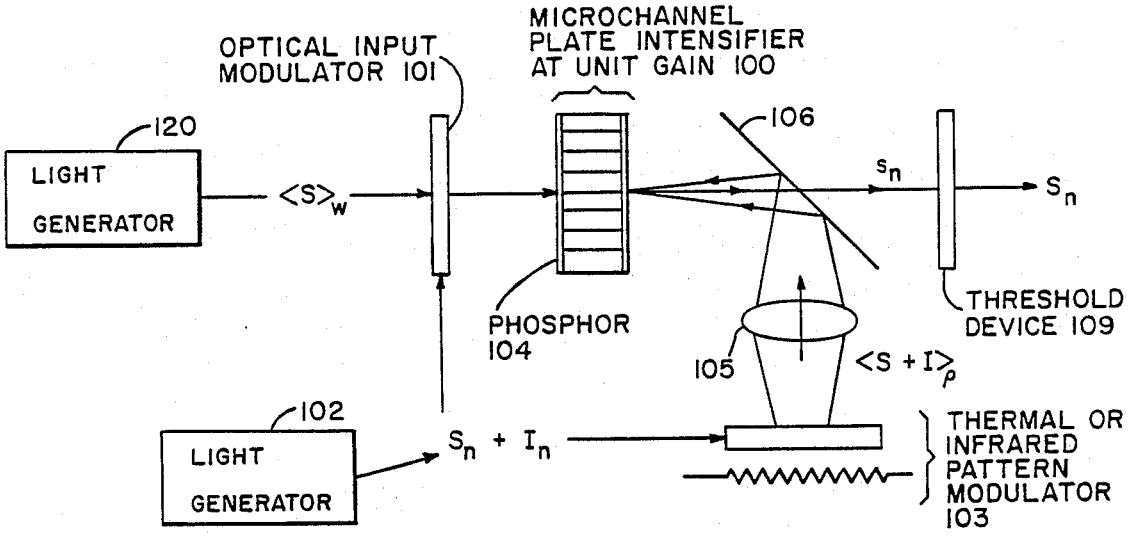
FIG. 1 shows the nonlinear phosphor embodiment.

This disclosure describes three optical embodiments which perform the functions of a shunting, recurrent, on-center/off-surround neural network as taught by Grossberg (Studies of Mind and Brain, Stephen Grossberg, Reidel Publishing Co., Boston, 1982).

The Grossberg model for the networks is included in the set of equations:

$$s_n = -As_n + (B - s_n)(S_n + I_n) - (1)$$

$$s_n \sum_{k \neq n} \rho_{kn} (S_k + I_k) + \sum_{m \neq n} W_{mn} S_m$$

$$\dot{W}_{mn} = -DW_{mn} + S_m[s_n]^+ \quad (2)$$

$$S_n = [s_n - \Gamma]^+ \quad (3)$$

where $$[x]^+ \equiv \begin{cases} x, \text{ if } x \geqq o \\ o, \text{ otherwise} \end{cases}, \text{ for all real } x.$$

They are described in the appendices of Chapter 1 from the above cited reference. Here $S_n$ is the output of the nth node and $s_n$ is the internal activity in the nth node. The $I_n$ are the external inputs (such as a pixel output of a television screen from a video camera), and $W_{mn}$ are the adaptive synaptic weights, also located on the nth node. A, B, D, Γ, and $\rho_{kn}$ are system constants. The fourth term in eq. 1 is the adaptation term. The adaptation term and the adaptive weights are assumed to be accounted for by other means, and here serve as part of the nodal input for the devices discussed in this disclosure. The sum in the third term is a weighted average of local activity. B is the maximum value of $s_n$ and A and D are decay constants. Rewrite equation 1, defining $\rho_{nn}=1$, as $$\dot{s}_n = -(A + \langle S+I \rangle_\rho) s_n + B(S_n + I_n) + \langle S \rangle_w \quad (4)$$

where $\langle S + I \rangle \rho =$ $$\sum_{\text{all } k} \rho_{kn}(S_k + I_k) \text{ and } \langle S \rangle_w = \sum_{m \neq n} W_{mn} S_m.$$

$\langle S \rangle_w$ is the adaptively weighted signal to be added to the input signal to be processed.

Equation 4 is of the form $$\dot{s}_n(t) = -\alpha(t) s_n(t) + \beta(t) \quad (5)$$

where $\alpha = A + \langle S+I \rangle_\rho$ and $\beta = B(S_n + I_n) + \langle S \rangle_w$ The $\alpha$ function represents the local activity around the nth node plus a bias term A. The $\beta$ function represents the total excitatory input, direct plus adaptive, to the nth node.

Equation 5 is a first order linear differential equation and thus has the general solution (See *Differential Equations,* A. Cohen, D. C. Heath & Co., Boston, 1933, p. 30–31):

$$s_n(t) = \left\{ \exp\left[ - \int^t \alpha(t')dt \right] \right\} \times \left\{ \int^t \beta(\tau) \exp\left[ \int^t \alpha(t')dt' \right] d\tau + C_o \right\}$$

Choosing the initial condition $s_n(0)=0$, we then have $$s_n(t) = \int_o^t \beta(\tau) \exp\left[ - \int_\tau^t \alpha(t')dt' \right] d\tau, (6)$$

where the fact that $\tau$ varies from 0 to t has been recognized. This is the exact solution. It describes a system of automatic gain control (AGC) for the input signal $I_n$ in which the direct inputs and the adaptive inputs increase the nth node's activity while the local average activity acts to suppress it. Three possible interpretations of these functions are:

1. AGC by using a variable decay rate: Direct and adaptive inputs increase the number of excited states; local activity inhibits by increasing the decay rate and thus more quickly depleting the excited states.

2. AGC by local loss competition: Local activity causes more loss of action generated by direct and adaptive sources.
3. AGC by damped recursive loops: A causal response is implemented by a finite-difference recursion loop which is time-averaged to introduce damping; recursion proportional to local and previous activity, and subtracts (inhibits) direct plus adaptive inputs to the loop.

The last interpretation comes from observing two distinct approximations in equations 4 and 5:

(a) To first order, $$As_n\left(t+\frac{1}{A}\right)\cong s_n+As_n=-<S+I>\rho s_n(t)+\beta(t)$$

which implies a recursion loop.

(b) Viewing equation 4 as an integral equation (not the solution, just an alternate form)

$$s_n(t)=\int_o^t \exp[-A(t-\tau)][-<S+I>\rho s_n(\tau)+\beta(\tau)]dt$$

and approximating the exponentially weighted time average with a linearly weighted time average, yields $$s_n(t)\cong<<s+I>_\rho+\beta>_{\Delta t}$$

This removes high frequencies above $$\omega\cong\frac{2\pi}{\Delta t}.$$

Combining the loop feature and the filter average (this does not explicitly follow from equation 4, but is an approximate functional interpretation), leads to the concept of $$s_n\left(t+\frac{1}{A}\right)\cong\frac{1}{A}<-<S+I>\rho s_n(t)+\beta(t)>\Delta t$$

Equations 4 and 6 are similar to the output of a phosphor with a variable decay constant. Some phosphors have intensity-dependent decay constants, most have a hyperbolic decay, rather than exponential, and generally the decay constant is temperature dependent. At higher temperatures the lifetime of the emitting state decreases due to nonradiative deexcitation (Ref. Am. Inst. of Physics Handbook, 3rd edition, p. 9–169). Accordingly, FIG. 1 shows a microchannel plate intensifier 100 at unit gain with $\beta(t)$ as the input. A light generator 120 produces the $<S>_w$ signal which is sent to optical input modulator 101. Light generator 102 poduces the signal $S_n+I_n$ which is sent to both modulator 101 and thermal or infrared pattern modulator 103 The modulators 101 and 103 produce light patterns from their inputs. The output phosphor screen 104 is heat sunk and receives a radiant or infrared heat flux distribution proportional to the time-dependent local average $<S+I>_\rho$by way of the deliberately defocussed lens 105 and partial reflector 106. The phosphor intensity output distribution at the nth point is then approximately $s_n$. A nonlinear device 109 such as a video signal processor or an optically bistable etalon acts as a threshold device, thereby preventing recycled noise from being amplified, and providing an $S_n$ output which is recirculated back to modulators 101 and 103 and to the adaptive section to provide the desired recurrent loops.

Figure 2:
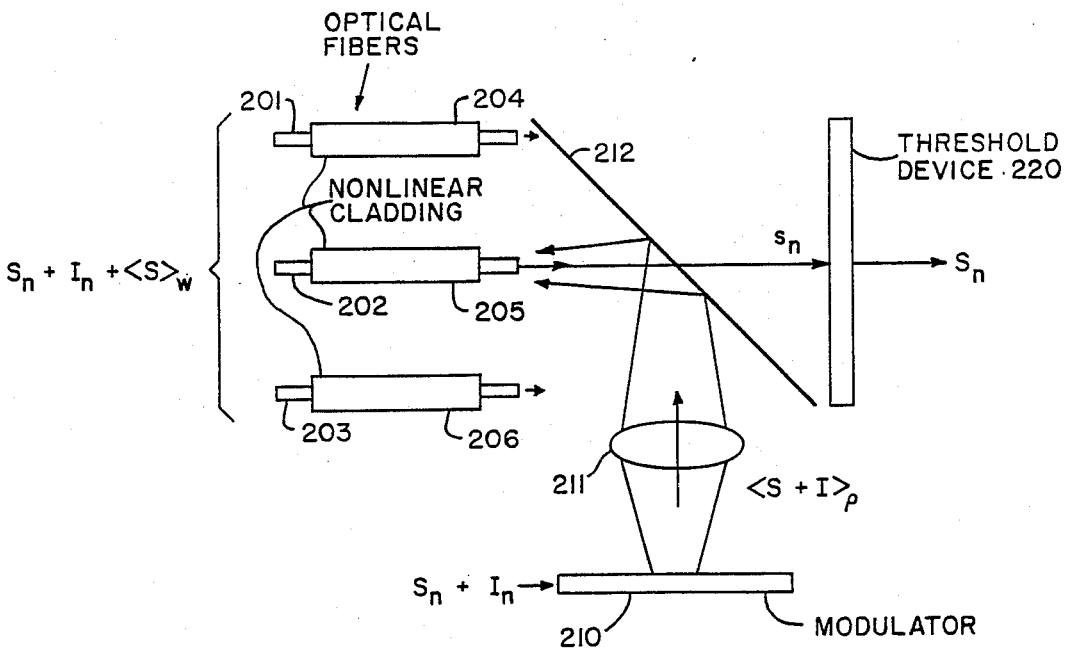
FIG. 2 shows the nonlinear cladding embodiment.

The nth node in FIG. 2 could be an array of short lengths of optical fibers 201–203 with nonlinear cladding 204–206. The direct plus adaptive input is generated and enters at angles slightly less than the critical angle of refraction of the fiber-cladding interface. The volume external to the fiber is illuminated with an intensity proportional to the local average activity by modulator 210, lens 211 and partial reflector 212 in a manner similar to that shown in FIG. 1. The cladding index of refraction change due to this intensity changes the value of the critical angle and causes losses in the beam inside the fiber, producing an output equal to $s_n$. Threshold device 220 converts $s_n$ to $S_n$ which is recirculated back to modulator 210 and to the direct plus adaptive input generation section to provide the desired recurrent loops. A plurality of fibers are added to form an array to cover the image being processed.

Figure 3:
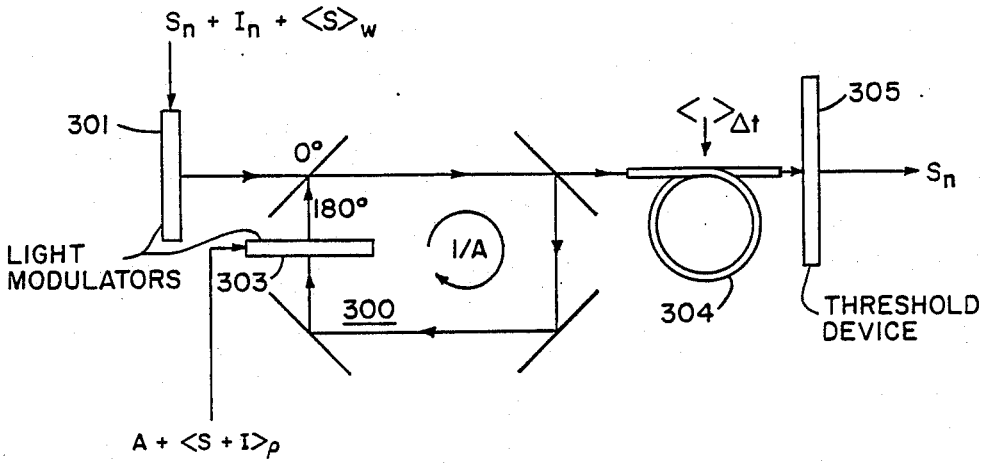
FIG. 3 shows the damped inhibitory loop embodiment.

FIG. 3 shows a ring cavity 300. The input to the ring cavity from light modulator 301 is the direct plus adaptive sum. The recursive beam passes through a second modulator 303 which is proportional to the local average activity plus a constant. The beams are coherent and are added out of phase to complete the loop. The output beam is time averaged by, for example, a length of multimodal fiber 304, and then passes through a nonlinear optical threshold element 305 to generate the node output which is recirculated back to modulators 301 and 303 and to the adaptive section to provide the desired recurrent loops. An array of these elements (with thresholder 305) will produce all the nodes.

I claim:

1. A signal processor comprising a phosphor screen which is nonlinear with respect to temperature, said screen having an input and an output, first generating means producing at its output an input signal to be processed, second generation means producing a weighted signal, combining means having inputs connected to said input signal and said weighted signal and having an output connected to the input of said phosphor screen whereby a combination signal of said input and weighted signals drive said phosphor screen, a thermal pattern modulator having a controlling input connected to said input signal and having an output which is directed towards said phosphor screen so as to heat individual areas of the screen in accordance to a pattern dictated by said input signal, and a threshold device detecting and processing the output of said phosphor screen.

2. A signal processor comprising a plurality of optical fibers arranged in an array, said array having an input and an output, first generating means producing an input signal to be processed and a weighted signal, a plurality of nonlinear cladding about the optical fibers, each cladding having an index of refraction which is dependent upon the intensity of illumination directed upon the cladding, means sending both signals to the input of said array at an angle so that the array will incur a loss in a mathematical relationship to the cladding index of refraction, illumination means having a controlling input and an output, said input signal being fed to the controlling input of said illumination means so as to cause the output of said illumination means to have an intensity pattern in accordance to the input signal, directing means between said illumination means and said cladding for directing the output of the illumination means towards said cladding, and a threshold device detecting and processing the output of said array.

3. A signal processor comprising an array of paths each comprising a ring cavity, a first generator sending an input signal beam to be processed to said ring cavity, second generator sending a weighting signal beam to said ring cavity such that the beams are coherent and are added 180° out of phase to complete the loop and create an output signal beam, a length of multimodal fiber having an input fed said output beam so as to time average the output beam at an output of said fiber, and a threshold device detecting and processing the output signal beam of all said paths.

* * * * *